United States Patent [19]

Lin et al.

[11] Patent Number: 4,680,354

[45] Date of Patent: Jul. 14, 1987

[54] LOW MOLECULAR WEIGHT POLYMERS AND COPOLYMERS

[75] Inventors: Ju-Chui Lin, Strongsville; Kirk J. Abbey, Seville, both of Ohio

[73] Assignee: The Glidden Company, Cleveland, Ohio

[21] Appl. No.: 865,555

[22] Filed: May 21, 1986

[51] Int. Cl.⁴ .............................................. C08F 4/06
[52] U.S. Cl. .................................. 526/172; 548/101; 540/145
[58] Field of Search ........................ 526/172; 548/101; 540/145

[56] References Cited

U.S. PATENT DOCUMENTS 4,526,945  7/1985  Carlson et al. ...................... 526/172

Primary Examiner—Paul R. Michl
Assistant Examiner—Alex H. Walker
Attorney, Agent, or Firm—Thomas M. Schmitz

[57] ABSTRACT

New Cobalt(II) nitrilomethylidyne dipyrrole complexes such as Cobalt(II) 2,2'-[trimethylenebis(nitrilomethylidyne)]-dipyrrole, Cobalt(II) 2,2'-[o-phenylenebis(nitrilomethylidyne)]-dipyrrole and their basic ligand complexes are effective catalysts for molecular weight control in acrylate/methacrylate polymerization.

The process comprises polymerizing monomers, especially including methacrylic monomer or methacrylic-/acrylic monomer, in the presence of azo initiator and between 0.0001% and 0.01% of Cobalt(II) 2,2'-[trimethylenebis(nitrilomethylidyne)]-dipyrrole and/or Cobalt(II) 2,2'-[o-phenylenebis(nitrilomethylidyne)]-dipyrrole complexes to produce low molecular weight acrylate polymers and copolymers.

11 Claims, No Drawings

LOW MOLECULAR WEIGHT POLYMERS AND COPOLYMERS

This invention relates to Cobalt(II) nitrilomethylidyne dipyrrole complexes useful as new metal catalysts for chain transfer (MECCA) in free-radical polymerization and to a process for the preparation of low molecular weight methacrylate or methacrylate/acrylate polymers. The process relates to the free-radical polymerization of methacrylate/acrylate monomers and a lesser amount of other ethylenically unsaturated monomers in the presence of certain dipyrrole Schiff base complexes of Cobalt(II) derived from 2,2'-[trimethylenebis(nitrilomethylidyne)]-dipyrrole [14942-62-2] or 2,2'-[o-phenylenebis(nitrilomethylidyne)]-dipyrrole [15072-08-9] and axial ligands including amines, pyridines, tertiary aryl or alkyl phosphines, imidazoles and the like.

The process is particularly useful for controlling molecular weights to produce low molecular weight methacrylate polymers and methacrylate/acrylate copolymers.

Current techniques for controlling molecular weights of polymers involve the addition of chain transfer agents, such as mercaptans, to the polymerization media. The occurrence of chain transfer to the chain transfer agent results in decreased molecular weight of the polymer formed. However, the addition of chain transfer agents can cause several problems including consumption of the chain transfer agent resulting in broad molecular weight distributions, odor problems related to the chain transfer agent and increased cost of the final product due to the high level of chain transfer agent. A recent publication (Enikolopyan, et al, *J. Poly. Sci., Polm. Chem. Ed.*, 19, 879 (1981), described the use of cobalt porphryin complexes as catalysts for chain transfer to monomer. Each porphyrin molecule causes up to 2,000 transfer reactions compared to chain transfer agents which typically are active in only one transfer reaction. A recent journal article, "Acc. Chem. Res." 16, 343 (1983) discloses the use of cobalt dimethylglyoxime complexes as catalysts in free radical reactions.

It has now been found that the use of very low amounts of the instant dipyrrole Schiff base complexes of Cobalt(II) provides excellent chain transfer mechanisms for controlling polymer molecular weight to produce low molecular weight methacrylate polymers and copolymers. Low molecular polymer weight between about 200 and 30,000 containing between about 2 and 200 average copolymerized monomer units can be produced by copolymerizing methacrylate and acrylate monomers, with minor amounts of other ethylenic monomers if desired, in the presence of 0.1–5,000 ppm by weight of the instant Cobalt(II) complexes in combination with azo initiators. Polymer synthesized in accordance with this invention exhibits controlled low molecular weight on the order of 200–30,000 as compared to about 100,000 in the absence of the Cobalt(II) transfer agent. The process is particularly suitable for controlling the molecular weight of methacrylate polymers and copolymers.

A recent patent (U.S. Pat. No. 4,526,945) disclosed that the use of a very low amount (100~10,000 ppm) of a dimethylglyoxime (DMG) or other dioxime complexes of Cobalt(II) provides excellent chain transfer mechanisms for controlling polymer molecular weight to produce low molecular weight methacrylate polymers and copolymers, or even dimers (U.S. Pat. No. 4,547,323). (See also Burczyk, O'Driscoll and Rempel (*J. Polym. Sci., Polym. Chem. Ed.* 1984, 22, 3255–3262.)

The instant catalyst systems are superior to those set forth in U.S. Pat. No. 4,526,945 in that for the first time mixtures of acrylates and methacrylates can be copolymerized, optionally with other ethylenically unsaturated monomers, under conditions that allow the formation of low molecular weight products. Heretofore acrylates poisoned or severely retarded the effectiveness of the previously known cobalt catalysts that were effective with methacrylates.

These and other advantages of this invention will become more apparent by referring to the detailed description of the invention and the illustrative examples.

SUMMARY OF THE INVENTION

The invention relates to Cobalt(II) nitrilomethylidyne dipyrrole complexes useful as new metal catalysts for chain transfer (MECCA) polymerization.

The invention further relates to a process for producing low molecular weight polymer and copolymers by polymerizing methacrylate monomers (or mixtures with acrylate monomers) used alone or with lesser amounts of other ethylenic monomers in the presence of azo or similar free-radical initiators in conjunction with between 0.1 ppm and 5,000 ppm by weight of the Cobalt(II) nitrilomethylidyne dipyrrole complex catalyst.

DETAILED DESCRIPTION OF THE INVENTION

The process of this invention comprises polymerizing methacrylate/acrylate monomers in the presence of nitrilomethylidyne complex of Cobalt(II) and azo catalyst to produce low molecular weight methacrylate/acrylate polymers.

Referring first to the organic Cobalt(II) catalyst complex, the Cobalt(II) catalyst comprises between 0.1 and 5,000 ppm of Cobalt(II) chloride hydrate wherein the cobalt is complexed with 2,2'-[trimethylenebis(nitrilomethylidyne]-dipyrrole sometimes referred to herein as $Co^{++}$ [TBND]$^{--}$ and Cobalt(II) 2,2'-[o-phenylenebis(nitrilomethylidyne)]-dipyrrole sometimes referred to herein as $Co^{++}$ [OBND]$^{--}$. While the pyridine complexes of the above compounds are preferred, other commonly and axial (basic) ligands may be used including various trialkyl or aryl phosphines, various imidazole derivatives, and various trialkyl amines, dialkylamines and the like. The dipyrrole Schiff's bases have the following structures and overall are neutral complexes:

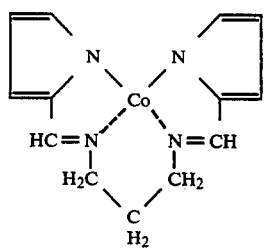

$Co^{++}$ [TBND]$^{=}$

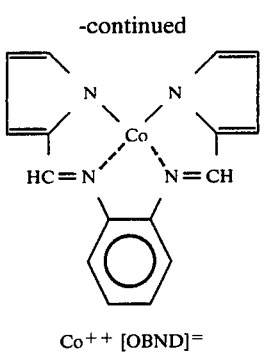

Co++ [OBND]=

In addition to the preferred catalysts illustrated above, other effective catalysts include those where the trimethylene or the o-phenylene diradical is replaced by —R— radicals.

Useful alkylene diradicals (—R—) include such as for example 1,2-ethylene, 1,2-propylene, 1,2-butylene, 1,5-pentamethylene, 2,5-pentylene, 3,5-pentylene, 2,2-dimethyl-1,3-propylene, 1,6-hexalene, 1,7-heptylene, 1,8-octylene, 1,10-decylene, 1,12-dodecylene, 2-methyl-1,2-propylene, 1,2-cyclohexylene and the like.

Similarly the orthophenylene may be replaced by cycloaromatic diradicals such as 3,4-tolylene, 3,4-pyridinylene, 4,5-pyrimidylene, 1,8-naphthylene and by cycloaliphatic rings having 3 to 6 carbon rings.

Referring next to the methacrylic and acrylic monomers, the monomers are generally illustrated by the structure:

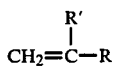

wherein R' is H or methyl and wherein R represents any functionality not interfering with the catalytic ability of the catalyst complex. These functionalities can include esters, including alkyl, aryl, isocyanatoalkyl, hydroxyalkyl, aminoalkyl, haloalkyl, and other substituted alkyl and aryl esters, methacrylic acid and its acid salts, and other derivatives of methacrylic acid including methacrylonitrile, methacrolein, methacrylamide, and 2-(2-propenyl)-oxazoline.

(Meth)acrylic acid derivatives are ethylenically unsaturated monomers such as lower alkyl esters of methacrylic or acrylic acid having an alkyl ester portion containing between 1 to 22 carbon atoms as well as aromatic derivatives of acrylic and methacrylic acid. Useful monomers include, for example, (meth)acrylic acid, methyl (meth)acrylate, ethyl (meth)acrylate, butyl (meth)acrylate, propyl (meth)acrylate, 2-ethylhexyl (meth)acrylate, cyclohexyl (meth)acrylate, decyl (meth)acrylate, isodecyl (meth)acrylate, benzyl (meth)acrylate, and various reaction products such as butyl, phenyl, and cresyl glycidyl esters reacted with methacrylic acids, hydroxyl alkyl (meth)acrylates such as hydroxyethyl and hydroxypropyl (meth-)acrylates, as well as amino (meth)acrylates, 2-isocyanatoethyl (meth-)acrylate and glycidyl (meth)acrylate, N,N-dimethyl-3-propyl acrylamide, methacrylamide, dimethyl amino ethyl (meth)acrylate.

The Cobalt(II) complexes of TBND and OBND are very effective chain transfer agents and very effective for controlling molecular weight in producing low molecular weight methacrylic polymers. Copolymers of methacrylates with acrylates can be prepared containing from essentially 0.02% acrylate to about 99.8% acrylate comonomer preferably from about 5-70%. Methacrylate monomers optionally with acrylate monomers present, can be copolymerized with lesser amounts of other ethylenically unsaturated monomers wherein the polymerizable monomer mixture can contain up to about 50% of other ethylenically unsaturated monomer.

Other polymerizable ethylenically unsaturated monomers contain carbon-to-carbon unsaturation and include vinyl monomers, allylic monomers, and other monomers which do not adversely affect the catalyst complex, most preferred is styrene.

In accordance with the process of this invention, methacrylic monomer can be polymerized by reacting the methacrylic derivative monomer in the presence of the Cobalt(II) organic complex catalyst and non-reactive solvent, if desired, and free radical initiator at temperatures between 0° C. and 150° C. and preferably above 50° C. for thermal initiation. Photochemical initiation can be below 50° C. and even lower than 0° if desired. Reflux temperatures for the monomer-solvent mixtures ordinarily are desirable. Preferred polymerization initiators are azo compounds such as azodiisobutyronitrile (AIBN) and dimethylazodiisobutyrate.

Batch polymerizations can be carried out in a nitrogen flushed reactor under a nitrogen flow. The polymerization must be carried out in the absence of oxygen or under nitrogen blanket to avoid undesirable interference of oxygen with the Cobalt(II) catalyst. The monomer, solvent, and initiator can then be charged to the reactor. The catalyst can be formed in situ by the addition of ligand and Cobalt(II) acetate tetrahydrate or chloride hexahydrate. Semi-continuous polymerizations can be carried out in a reactor equipped with a stirrer (mechanical or magnetic), thermometer, condenser, and nitrogen inlet. Solvent was charged to the reactor and flushed thoroughly with nitrogen during upheat to reflux. The initiator and monomer solution was added dropwise over approximately 2 hours.

A typical procedure for the preparation of low molecular weight methacrylate/acrylate polymer using the dipyrrole Schiff's base Cobalt(II) complexes of TBND [14942-62-2] and OBND [15072-08-9] consist of adding the acrylate/methacrylate monomer mixture, a solvent such as methylethyl ketone and the free-radical initiator to a flask. After a thorough flushing with nitrogen, the Cobalt(II) catalyst is added. Thereafter the solution is heated to 70° C. and held for 80 minutes before cooling and isolating the product. Typical weight average molecular weights of the resulting polymers range from about 5,000 to 25,000. These low molecular weights are in contrast to molecular weights of 64,000 and greater when the catalyst is omitted.

The following examples which illustrate the invention should not be read in a restrictive manner. Unless otherwise indicated, temperatures are given in degrees Centigrade, percentages are expressed as weight percentages, and Mn and Mw refer to number average molecular weight and weight average molecular weight, respectively.

EXAMPLE 1

Preparation of Dipyrrole Schiff's Base Cobalt(II) Complexes

1-A

In a 100-ml. volumetric flask, 0.310 gms. of TBND [14942-62-2], 0.294 gms. of CoCl$_2$.6H$_2$O, 7.0 ml. of pyridine, and 24.7 ml. KOH/MeOH (0.1N) were combined and MEK was added to a 100-ml. solution. The solution was a deep yellowish-brown color.

1-B

Similarly, 0.356 gms. of OBND [15072-08-9], 0.294 gms. of CoCl$_2$.6H$_2$O, 7.0 ml. of pyridine, and 24.7 ml. KOH/MeOH (0.1N) were combined and and MEK was added to a total volume of a 100-ml. solution. The solution was a deep yellowish-brown color.

1C

Similarly, 0.29 gms. of 2,2'-ethylenebis(nitrilomethylidyne)dipyrrole [EBND], 0.294 gms, of CoCl$_2$.6H$_2$O, 7.0 ml. of pyridine, and 24.7 ml. KOH/MeOH (0.1N) were combined and MEK was added to a 100-ml. solution. The solution was a deep red color.

Preparation of Control Complexes

1-D

Hematoprophyrin IX, 0.740 gms.; CoCl$_2$.6H$_2$O, 0.294 gms.; Pyridine, 7.0 ml. and 24.7 ml. KOH/Methanol (0.1N) were combined and MEK was added to a 100-ml. solution. The solution was a deep purple color.

1-E

Dimethyl glyoxime, 0.280 gms.; CoCl$_2$.6H$_2$O, 0.294 gms.; Pyridine, 7.0 ml., and 24.7 ml. KOH/Methanol (0.1N) were combined and MEK was added to a 100-ml. solution. The solution was a dark brown color.

1-F

N,N'-Bis(salicylidene)ethylenediaminecobalt(II), anhydrous 0.4 gms.; Pyridine, 7 ml.; KOH/Methanol (0.1N), 24.7 ml. were combined and MEK was added to a 100-ml. solution. The solution was a deep yellowish-brown color.

EXAMPLE 2

Preparation of Low Molecular Weight (LMW) Methacrylate Polymers

In a 200-ml. test tube, 10 gms. of methyl methacrylate were charged, 1% (by weight) of AIBN (Vazo 64) were dissolved in 2.5 ml. MEK and added to the test tube and blanketed by nitrogen flushing. Equivalent to 24 ppm of cobalt chloride hexahydrate (CoCl$_2$.6H$_2$O) containing catalyst solution, 1-A were added to the test tube and further flushed by N$_2$ for 30 minutes.

The test tube was then placed in a 70° C. preheated water bath for 80 minutes. The molecular weight of the final polymer obtained was $\overline{M}w$=22,300, Polydispersity (PD): 3.69 comparing it to the one without catalyst; $\overline{M}w$=64,400, Polydispersity (PD): 2.21. A similar reaction using the same amount of catalyst 1-B gave a $\overline{M}w$ of 5,330 (PD): 2.73. The one using cobaltoxime gave a e,ovs/M/ w of 36,600, Polydispersity (PD): 3.13. The results are shown in Table I.

TABLE I

| Composition (Wt. %) | $\overline{M}w$ × 10 − 3 (GPC) | PD (GPC) | MECCA (ppm) | Catalyst Type | Conversion, (%) (NV, %) | Example No. |
|---|---|---|---|---|---|---|
| MMA | 22.3 | 3.69 | 24 | 1A | 73.0 | 2-1A-1 |
|  | 26.4 | 4.22 | 24 | 1A | 84.3 | 2-1A-2 |
| MMA | 5.33 | 2.73 | 24 | 1B | 59.3 | 2-1B-1 |
|  | 6.68 | 3.33 | 24 | 1B | 65.8 | 2-1B-2 |
| MMA | 36.6 | 3.13 | 24 | 1E | 71.5 | Control |
|  | 36.7 | 3.44 | 24 | 1E | 75.9 | Control |
| MMA | 64.4 | 2.21 | 0 | — | 74.5 | Control |

EXAMPLE 3

Preparation of Low Molecular Weight (LMW) Methacrylate/Acrylate Polymer

Equal amounts of (5 gms. each) of methyl methacrylate and butyl acrylate were used, 1% (by weight) of AIBN (azoisobutyronitrile) were dissolved in 2.5 ml. MEK was added to the test tube and blanketed by nitrogen flushing. 480 ppm of cobalt chloride hexahydrate (CoCl$_2$.6H$_2$O) containing catalyst solution 1-A were added to the test tube and further flushed by N$_2$ for 30 minutes.

The test tube was then placed in a 70° C. preheated water bath for 80 minutes. The molecular weight of the final polymer obtained was $\overline{M}w$=10,100, comparing it to the one witout catalyst, $\overline{M}w$=83,700. A similar reaction using the same catalytical amount of catalyst 1-B, gave a $\overline{M}w$ of 5,290. The one using cobaltoxime gave a $\overline{M}w$ of 25,400. The results are shown in Table II including the examples of weight ratio of 9:1.

TABLE II

| Composition (Wt. %) | $\overline{M}w$ × 10 − 3 (GPC) | PD (GPC) | MECCA (ppm) | Catalyst Type | Conversion (%) (NV, %) | Example No. |
|---|---|---|---|---|---|---|
| MMA/BA (90/10) | 46 | 2.3 | 0 | — | 71.1 | Control |
| (90/10) | 121 | 4.1 | 0 | — | 61.4 | Control |
| MMA/BA (90/10) | 9.4 | 4.9 | 480 | 1E | 31.68 | Control |
| MMA/BA (90/10) | 1.73 | 4.32 | 480 | 1A | 36.96 | 3A |
| MMA/BA (90/10) | 2.33 | 4.00 | 480 | 1B | 47.04 | 3B |
| MMA/BA (50/50) | 2.36 | 2.85 | 480 | 1A | 39.12 | 3C |
|  | 10.1 | 9.84 | 480 | 1A | 54.24 | 3C |
| MMA/BA (50/50) | 5.64 | 2.07 | 480 | 1B | 51.36 | 3D |
|  | 5.29 | 1.91 | 480 | 1B | 48.48 | 3E |
| MMA/BA | 25.4 | 4.50 | 480 | 1E | 52.8 | Control |

TABLE II-continued

| Composition (Wt. %) | $\overline{Mw}$ × 10 − 3 (GPC) | PD (GPC) | MECCA (ppm) | Catalyst Type | Conversion (%) (NV, %) | Example No. |
|---|---|---|---|---|---|---|
| (50/50) | 23.9 | 2.31 | 480 | 1E | 48.8 | Control |
| MMA/BA (50/50) | 83.7 | 10.51 | 0 | — | 76.5 | Control |

EXAMPLE 4

In a manner similar to the process of Examples 1, 2, and 3, methyl methacrylate and ethyl acrylate were copolymerized at weight ratos of 1:1 and also at 9:1 using the catalysts of Examples 1-A and 1-B and Cobalt-(II) dimethylglyoxime. The results are shown in Table III.

TABLE III

| Example No. | Monomer (Wt. %) | PD | $\overline{Mw}$ | Catalyst (ppm) | Catalyst Type | Non-Volatile (%) |
|---|---|---|---|---|---|---|
| 4A | MMA/EA (9:1) | 3.45 | 980 | 480 | 1A | 34.3 |
| 4B | MMA/EA (9:1) | 3.95 | 1,360 | 480 | 1B | 36.2 |
| Control | MMA/EA (9:1) | 4.02 | 11,400 | 480 | 1E | 41.8 |
| Control | MMA/EA (9:1) | 3.61 | 68,100 | 0 | — | 68.9 |
| 4C | MMA/EA (1:1) | 2.19 | 2,420 | 480 | 1A | 51.1 |
| 4D | MMA/EA (1:1) | 2.89 | 6,080 | 480 | 1B | 57.4 |
| Control | MMA/EA (1:1) | 7.76 | 16,900 | 480 | 1E | 61.9 |
| Control | MMA/EA (1:1) | 6.64 | 47,900 | 0 | — | 84.2 |

EXAMPLE 5

Similarly, methyl methacrylate, butyl acrylate, and styrene were copolymerized at weight ratio of 8:1:1 using the catalysts of Examples 1-A and 1-B as well as Cobalt(II) dimethylglyoxime. The results are shown in Table IV.

TABLE IV

| Composition (Wt. %) | $\overline{Mw}$ × 10 − 3 (GPC) | PD (GPC) | MECCA (ppm) | Catalyst Type | Conversion (%) (NV, %) | Example No. |
|---|---|---|---|---|---|---|
| MMA/BA/ST (80/10/10) | 2.34 | 4.67 | 480 | 1A | 26.16 | 5A |
| MMA/BA/ST (80/10/10) | 3.52 | 5.40 | 480 | 1B | 20.64 | 5B |
| MMA/BA/ST (80/10/10) | 18.2 | 2.89 | 480 | 1F | 33.12 | Control |
| MMA/BA/ST (80/10/10) | 18.9 | 2.55 | 480 | 1D | 37.92 | Control |
| MMA/BA/ST (80/10/10) | 11.4 | 6.21 | 480 | 1E | 21.36 | Control |
| MMA/BA/ST (80/10/10) | 82.8 | 3.63 | 0 | — | 36.00 | Control |

What is claimed is:

1. A process for producing a low molecular weight polymer comprising copolymerizing ethylenically unsaturated monomers comprising a methacrylic monomer or a mixture of methacrylic and acrylic monomers, polymerized alone or with other ethylenic monomer in the presence of an effective amount of free-radical initiator in combination with 0.1 ppm to 5,000 ppm, basis monomer weight, Cobalt(II) nitrilomethylidyne dipyrrole complex catalyst comprising a Cobalt(II) nitrilomethylidyne dipyrrole complex modified by a basic ligand selected from the group consisting of amines, trisubstituted phosphines, and imidazole to produce a low molecule weight methacrylic polymer having a weight average molecular weight between 200 and 30,000.

2. The process of claim 1 wherein said Cobalt(II) complex is selected from the group consisting of Cobalt(II) 2,2'-[trimethylenebis (nitrilomethylidyne)]-dipyrrole and Cobalt(II) 2,2'-[o-phenylenebis(nitrilomethylidyne)]-dipyrrole.

3. The process of claim 1 wherein the Cobalt(II) catalyst is a Cobalt(II) 2,2'-[trimethylenebis(nitrilomethyidyne)]-dipyrrole complex and the ligand is pyridine.

4. The process of claim 1 wherein the Cobalt(II) catalyst is a Cobalt(II) 2,2'-[o-phenylenebis(nitrilomethylidyne)-]-dipyrrole and the ligand is triphenylphosphine.

5. The process of claim 1 wherein the Cobalt(II) catalyst is a Cobalt(II) 2,2'-[ethylenebis(nitrilomethylidyne)]dipyrrole and the ligand is triphenylphosphine.

6. The process of claim 2 wherein the monomer is a methacrylic monomer.

7. The process of claim 2 wherein the monomer is a mixture of methacrylic and acrylic monomers.

8. The process of claim 4 wherein the methacrylic monomer is selected from $C_{1-4}$ alkyl methacrylate and methacrylic acid.

9. The process of claim 7 wherein the monomer mixture comprises methyl methacrylate and ethyl acrylate.

10. The process of claim 7 wherein the monomer mix additionally contains styrene.

11. The process of claim 1 wherein the Cobalt(II) catalyst is a Cobalt(II)2,2'-[1,8-naphthalenebis(nitrolomethylidyne)]-dipyrrole.

* * * * *